US009042781B2

(12) United States Patent
Ito

(10) Patent No.: US 9,042,781 B2
(45) Date of Patent: May 26, 2015

(54) DOCUMENT READER WITH A PLURALITY OF HOLDING PORTIONS

(75) Inventor: Sakae Ito, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 347 days.

(21) Appl. No.: 13/278,209

(22) Filed: Oct. 21, 2011

(65) Prior Publication Data

US 2012/0099163 A1    Apr. 26, 2012

(30) Foreign Application Priority Data

Oct. 25, 2010    (JP) .................................. 2010-238681

(51) Int. Cl.
*H04N 1/00*    (2006.01)

(52) U.S. Cl.
CPC ... *H04N 1/00519* (2013.01); *G03G 2221/1681* (2013.01); *H04N 2201/0081* (2013.01)

(58) Field of Classification Search
CPC .................. G03G 2221/1681; H04N 1/00519; H04N 2201/0081
USPC .............................. 399/107, 108, 125; 355/21
See application file for complete search history.

(56) References Cited

U.S. PATENT DOCUMENTS

| D502,500 S | * | 3/2005 | Hoshiya et al. ................ D18/50 |
| 7,469,114 B2 | * | 12/2008 | Koido et al. .................. 399/107 |
| 7,489,886 B2 | | 2/2009 | Ito |
| D607,505 S | * | 1/2010 | Sasaki et al. .................. D18/55 |
| D647,133 S | * | 10/2011 | Sato et al. ..................... D18/55 |
| 2004/0247337 A1 | * | 12/2004 | Ohama et al. ................. 399/107 |
| 2007/0071492 A1 | | 3/2007 | Ito |

FOREIGN PATENT DOCUMENTS

| CN | 1940742 A | 4/2007 |
| JP | 11-275489 A | 10/1999 |
| JP | 2001-071586 A | 3/2001 |
| JP | 2005-189752 | 7/2005 |
| JP | 2007-083672 A | 4/2007 |
| JP | 2008-015052 A | 1/2008 |
| JP | 2009-271464 | 11/2009 |

OTHER PUBLICATIONS

Machine Translation of Senchi JP 2009-271464.*
Machine Translation of Hiramatsu JP 11-275489.*
(Continued)

*Primary Examiner* — Clayton E Laballe
*Assistant Examiner* — Trevor J Bervik
(74) *Attorney, Agent, or Firm* — Banner & Witcoff, Ltd.

(57) ABSTRACT

A document reader is provided, which includes side covers disposed to face each other to form side faces of a main body housing, each of the side covers including a protruding section formed with an upper portion of the side cover being protruded outward relative to the main body housing, the upper portion being higher than a predetermined position below a reading unit, the protruding section including a first finger-holding portion disposed on a lower surface of the protruding section, the first finger-holding portion being formed with a length in a longitudinal direction thereof as long as a length of a readable range for the reading unit in a main scanning direction, the first finger-holding portion being configured such that one or more operators put their fingers thereon from below, the first finger-holding portion including one or more ribs formed along the longitudinal direction of the first finger-holding portion.

13 Claims, 9 Drawing Sheets

(56) References Cited

OTHER PUBLICATIONS

JP Office Action mailed Jan. 8, 2013, JP Appln. 2010-238681, English translation.

Jan. 6, 2015—(CN) The Third Office Action—App 201110327993.X—Eng Tran.

Aug. 7, 2014—(CN) The Second Office Action—App 201110327993.X—Eng Tran.

* cited by examiner

DOCUMENT READER WITH A PLURALITY OF HOLDING PORTIONS

CROSS-REFERENCE TO RELATED APPLICATION

This application claims priority under 35 U.S.C. §119 from Japanese Patent Application No. 2010-238681 filed on Oct. 25, 2010. The entire subject matter of the application is incorporated herein by reference.

BACKGROUND

1. Technical Field

The following description relates to one or more techniques for a document reader including a reading unit disposed at an upper portion of a main body housing and one or more finger-holding portions used for transporting the document reader.

2. Related Art

So far, a document reader has been known, which includes an image reading unit disposed at an upper portion of a housing and a knob disposed on each of a front side face and a rear side face of the document reader. Each knob has a lower end of which a central portion is recessed. Therefore, an operator can move and transport the document reader while taking hold on the knob. Further, the knob has an anti-slipping member formed thereon. Thereby, it is possible to prevent a hand (fingers) of the operator from slipping when holding the knob.

SUMMARY

In the aforementioned known document reader, each knob is generally formed to be held by a single operator. Namely, each knob is generally formed under an assumption that the knob is held by a single hand. Nonetheless, when the document reader is configured with a larger size and a heavier weight, it becomes harder for a single operator to move and transport the document reader. In such a case, the document reader needs to be transported by two or more operators. However, according to the known document reader, since each knob is formed to be exclusively held by a single hand, two or more operators cannot hold the knob together to move and transport the document reader.

Thus, one or more operators who cannot use the knob need to hold a portion of the document reader other than the knob to transport the document reader. In this situation, when the one or more operators hold a portion of the document reader that should not be held, the document reader might be damaged.

Aspects of the present invention are advantageous to provide one or more improved techniques for a document reader that allow a plurality of operators to properly handle and transport the document reader and prevent the document reader from being damaged when transported.

According to aspects of the present invention, a document reader is provided, which includes a main body housing configured to accommodate various components of the document reader, a reading unit disposed at an upper side of the main body housing, the reading unit being configured to read an image of a document sheet, and side covers disposed to face each other to form side faces of the main body housing, each of the side covers including a protruding section formed with an upper portion of the side cover being protruded outward relative to the main body housing, the upper portion being higher than a predetermined position below the reading unit, the protruding section including a first finger-holding portion disposed on a lower surface of the protruding section, the first finger-holding portion being formed with a length in a longitudinal direction thereof as long as a length of a readable range for the reading unit in a main scanning direction, the first finger-holding portion being configured such that one or more operators put their fingers thereon from below, the first finger-holding portion including one or more ribs formed along the longitudinal direction of the first finger-holding portion.

BRIEF DESCRIPTION OF THE ACCOMPANYING DRAWINGS

Figure 9:
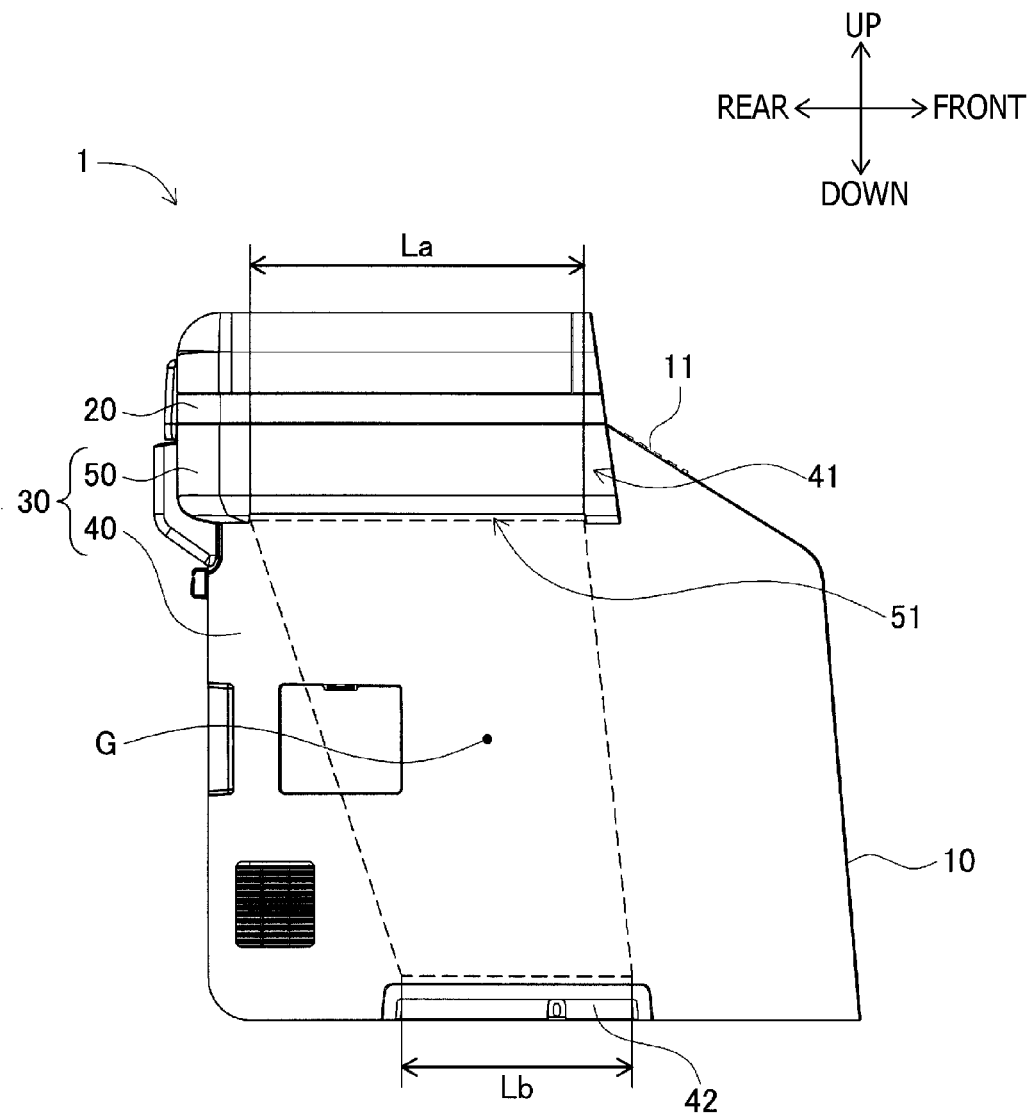

FIG. 9 schematically shows a positional relationship between the first and second finger-holding portions and the center of gravity of the MFP in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect.

Figure 1:
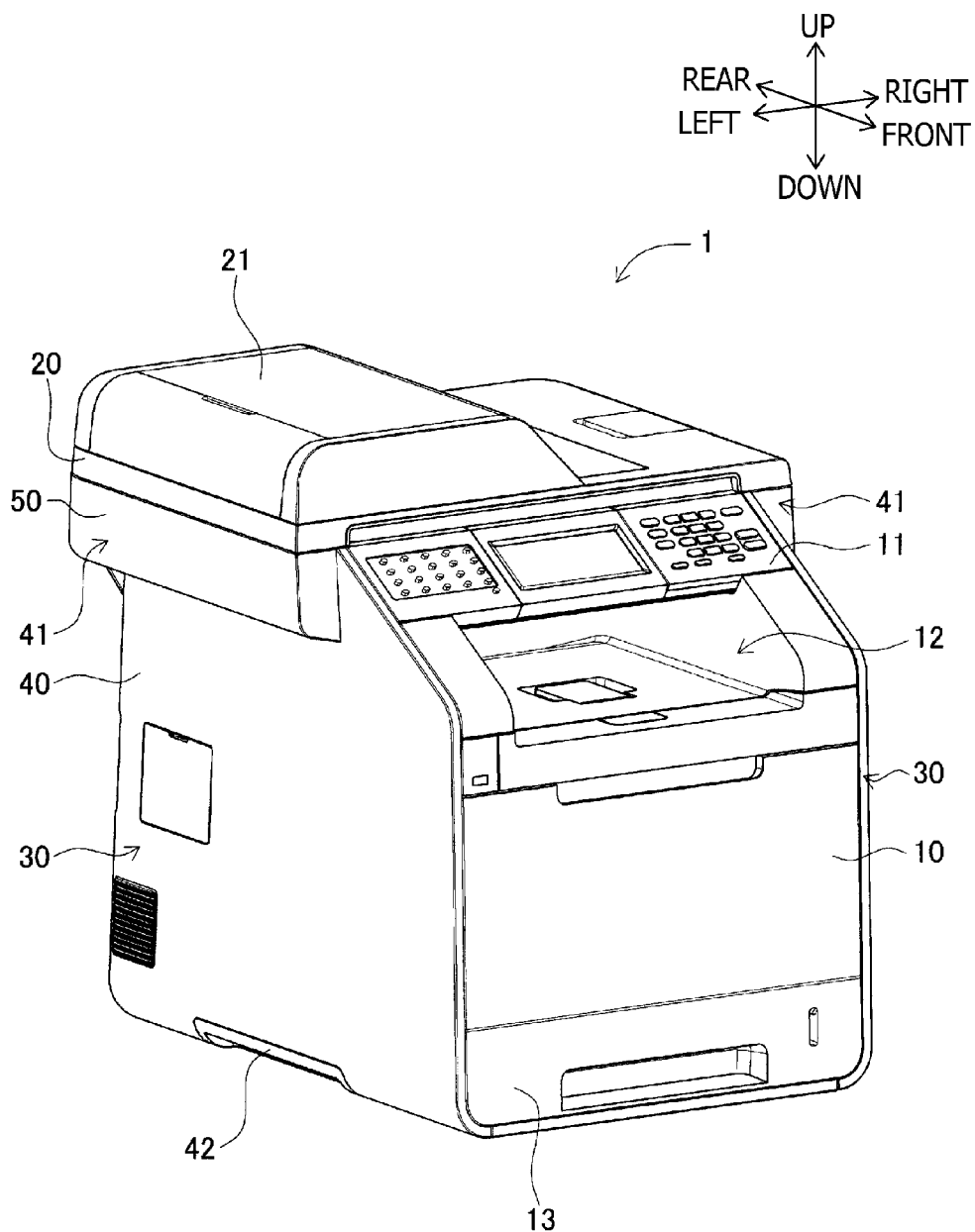
FIG. 1 is an external perspective view of a multi-function peripheral (MFP) in an embodiment according to one or more aspects of the present invention.

Hereinafter, a multi-function peripheral (MFP) 1 of an embodiment according to aspects of the present invention will be described with reference to the accompanying drawings. It is noted that, in the following description, a front-to-rear direction, a left-to-right direction, and an up-to-down direction (the vertical direction) will be defined with respect to the MFP 1 as shown in FIG. 1.

The MFP 1 has multiple functions such as a scanning function, a copy function, a printing function, and a facsimile function. The MFP 1 includes various units (e.g., a below-mentioned scanning unit 25 and a printing unit (not shown)) required for achieving the aforementioned functions. Each of the various units is attached to a predetermined position via a main body frame 15 inside a main body housing 10.

The main body housing 10, which forms an exterior of the MFP 1, includes side covers 30 forming both side faces of the main body housing 10 in the left-to-right direction. The MFP 1 includes an operation unit 11 disposed at an upper front side of the main body housing 10. The operation unit 11 includes a plurality of operation keys and a display device. A user operates the operation unit 11 to input various instructions to the MFP 1 therethrough.

Further, the MFP 1 includes a feed cassette 13 that is attached to a lower portion of the main body housing 10 to be able to be drawn along the front-to-rear direction. The feed cassette 13 is configured to accommodate a stack of sheets to be used for printing by the printing unit (not shown) disposed inside the main body housing 10.

Additionally, the MFP 1 includes a discharge tray 12 formed in an internal space of the main body housing 10 of which a front side is open, between the operation unit 11 and the feed cassette 13. The discharge tray 12 is configured such that sheets are discharged thereon after being fed from the feed cassette 13 and printed by the printing unit.

Figure 2:
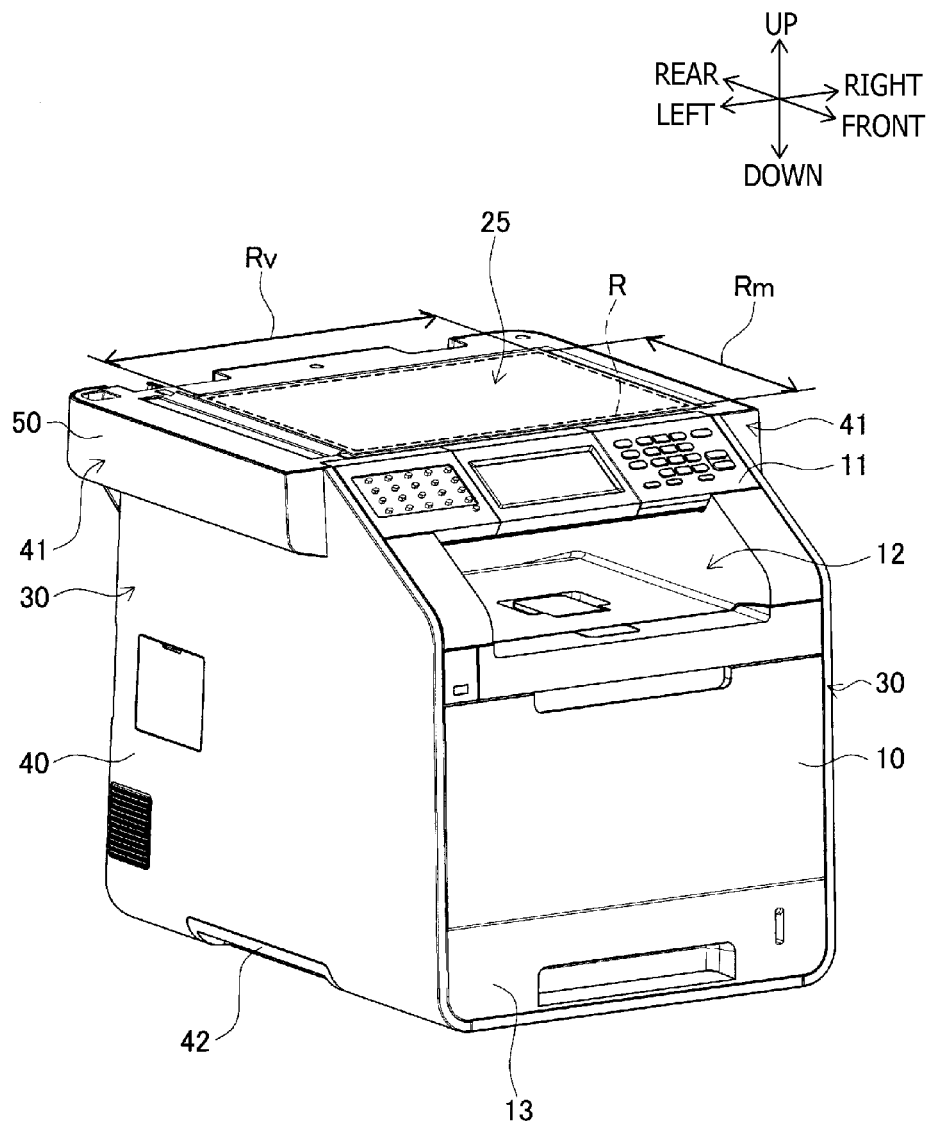
FIG. 2 is an external perspective view of the MFP in a state where an upper cover is removed therefrom in the embodiment according to one or more aspects of the present invention.
Figure 3:
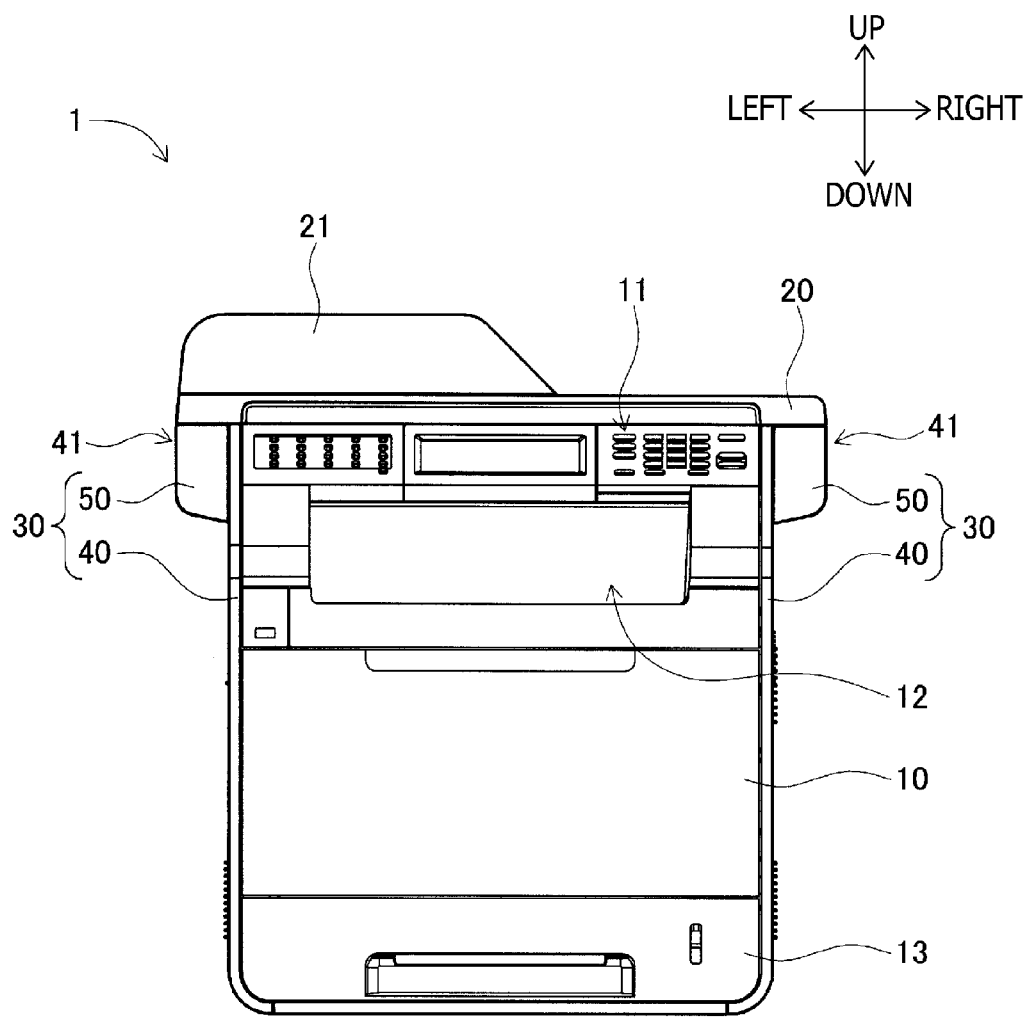
FIG. 3 is a front view of the MFP in the embodiment according to one or more aspects of the present invention.
Figure 4:
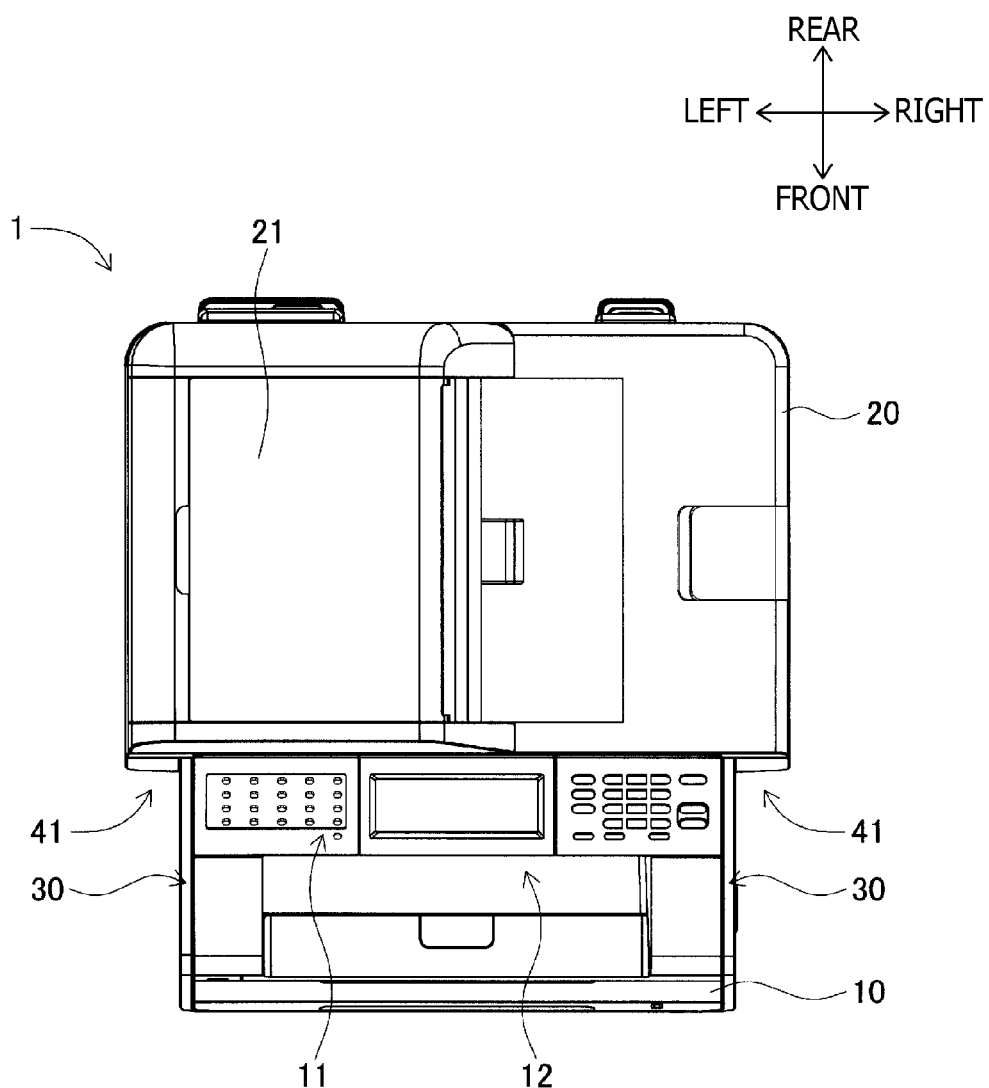
FIG. 4 is a top view of the MFP in the embodiment according to one or more aspects of the present invention.
Figure 5:
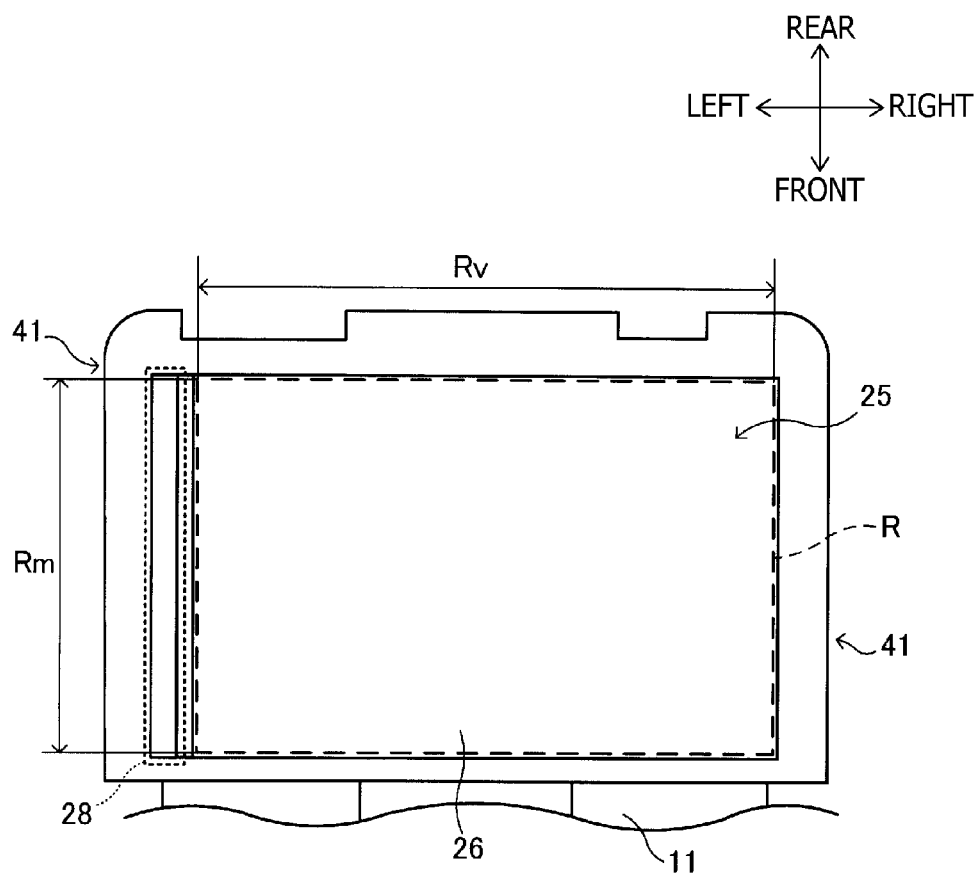
FIG. 5 illustrates a readable area for a scanning unit of the MFP in the embodiment according to one or more aspects of the present invention.

As shown in FIGS. 2 and 5, a scanning unit 25 is disposed at an upper side of the main body housing 10. The scanning unit 25 includes a contact glass 26, a scanner base 27, and a reading sensor 28. The scanning unit 25 is configured to read out an image of a document sheet placed on the contact glass 26 with the reading sensor 28. The contact glass 26, which is a so-called platen glass, forms an upper face of the scanning unit 25. The contact glass 26 has a rectangular shape larger than the legal size and a longitudinal direction along the left-to-right direction of the main body housing 10. The contact glass 26 serves as a loading surface on which a document sheet to be read is placed. The scanner base 27 forms a basic frame of the scanning unit 25.

The reading sensor 28 is configured with a contact image sensor (CIS), so as to read an image of a document sheet placed on the contact glass 26. The reading sensor 28 has a readable range as long as the short side of the legal size in a main scanning direction (i.e., the front-to-rear direction of the main body housing 10). Further, the reading sensor 28 is configured to reciprocate relative to the scanner base 27 within a predetermined range along a sub scanning direction (i.e., the left-to-right direction of the main body housing 10).

Accordingly, in the MFP 1, the scanning unit 25 has readable area R (see FIGS. 2 and 5), corresponding to substantially a whole area of the contact glass 26, within which the scanning unit 25 can perform image reading while reciprocating the reading sensor 28 along the sub scanning direction. It is noted that, in the embodiment, a range of the readable area R in the main scanning direction is defined as a "main scanning range Rm," and a range of the readable area R in the sub scanning direction is defined as a "sub scanning range Rv."

The upper cover 20 is configured to be openable and closable with a rear end of the upper face of the main body housing 10 as an axis. When closed, the upper cover 20 covers the upper face of the main body housing 10 (i.e., the contact glass 26). Accordingly, the upper cover 20 can firmly hold a document sheet placed on the contact glass 26 as placed.

Further, the upper cover 20 includes an automatic document feeder (ADF) 21, which is disposed at a left side of the upper cover 20. The ADF 21 is configured to sequentially feed document sheets placed on a document tray (not shown) formed at the upper cover 20 on a sheet-by-sheet basis, convey the document sheets along a predetermined feeding path, and discharge the document sheets onto a discharge tray formed on the upper cover 20. The MFP 1 can read out images of the document sheets by reading the images with the scanning unit 25 in the middle of conveying the document sheets with the ADF 21.

In the embodiment, the MFP 1 includes protruding sections 41 that protrude along the left-to-right direction of the main body housing 10 at the upper portion of the MFP 1. Each protruding section 41 includes a below-mentioned first finger-holding portion 51 formed on a lower surface thereof (see FIGS. 6 and 7). At the time of transportation of the MFP 1, the protruding sections 41 including the first finger-holding portions 51 are used. The protruding sections 41 are formed with the side covers 30 that form the right side face and the left side face, respectively. In the embodiment, each side cover 30 includes a first cover member 40 and a second cover member 50.

Figure 7:
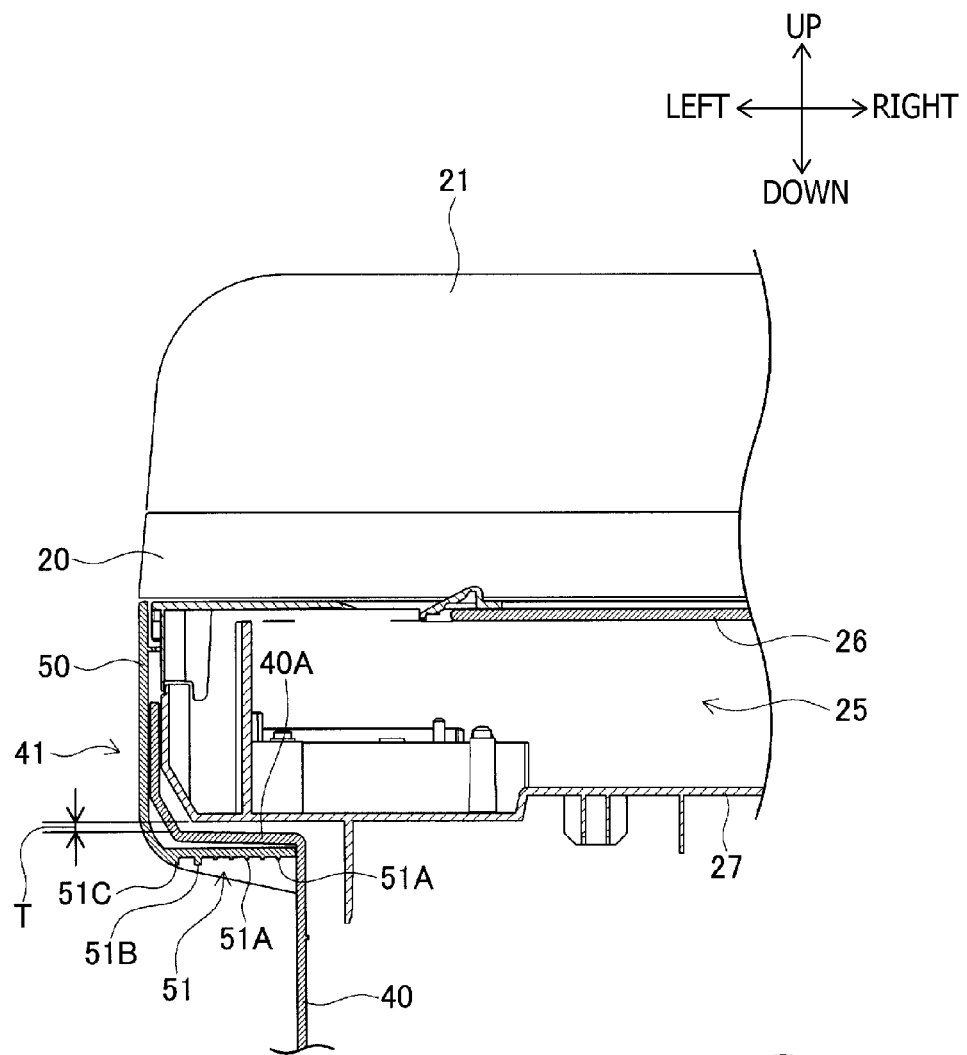
FIG. 7 is a cross-sectional view showing a configuration around a protruding section and the first finger-holding portion of the MFP in the embodiment according to one or more aspects of the present invention.
Figure 8:
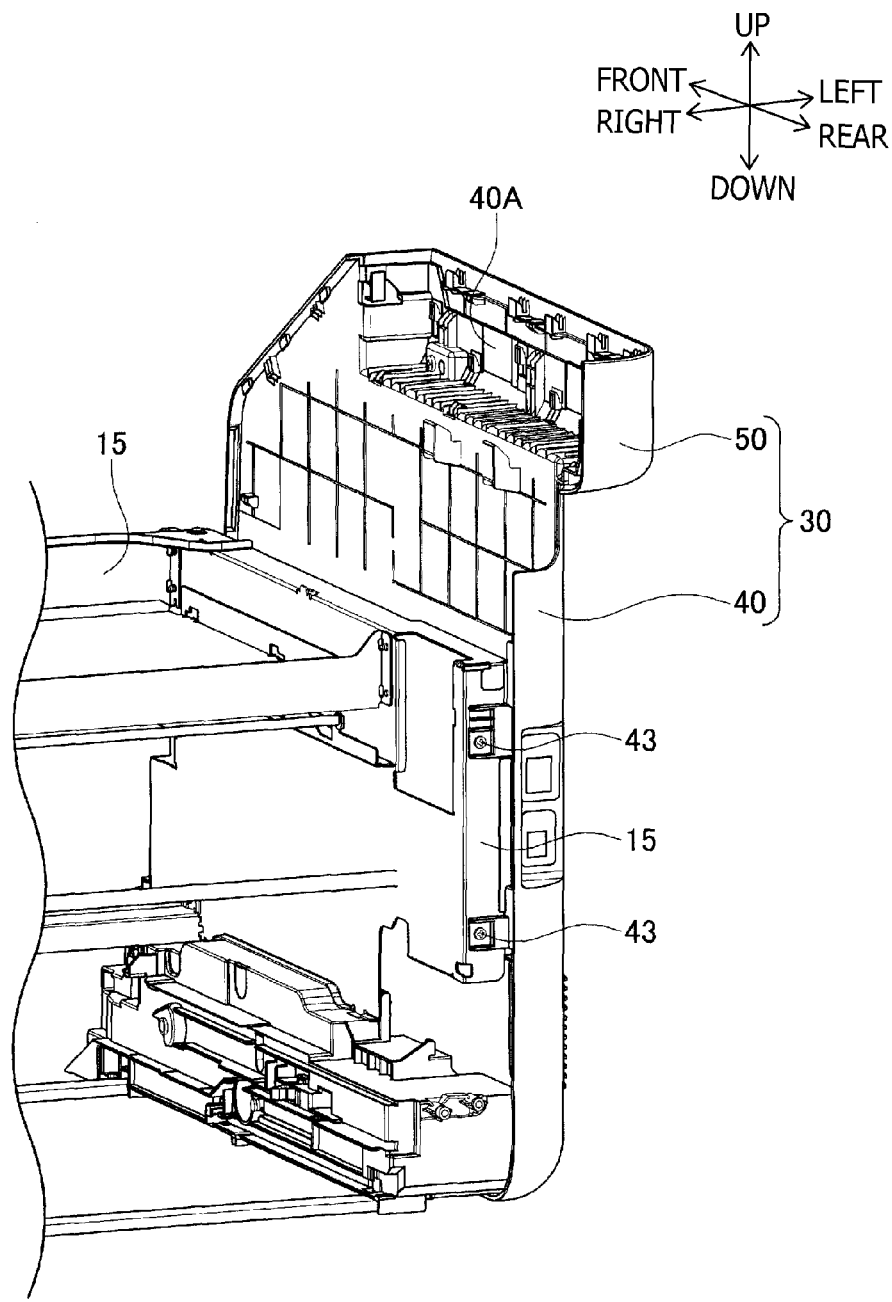
FIG. 8 illustrates a structure of a side cover attached to a main body frame of the MFP in the embodiment according to one or more aspects of the present invention.

Each first cover member 40 forms a major part of the corresponding side cover 30. The first cover member 40 includes an inside wall 40A of the protruding section 41, a second finger-holding portion 42, and frame supporting portions 43. As illustrated in FIGS. 7 and 8, at an upper side of each of the first cover members 40 that form the left side face and the right side face of the main body housing 10, the inside wall 40A is formed to protrude toward an outside of the main body housing 10 (i.e., in the left direction or the right direction). The protruding section 41 is configured with the inside wall 40A of the first cover member 40 and the second cover member 50 that covers an outer surface of the main body housing 10 (an outer surface of the inside wall 40A of the first cover member 40). The second cover member 50 will be described in detail below. Thus, in a state where the side covers 30 form the side faces of the main body housing 10, each protruding section 41 is formed with an upper portion of the side cover 30 higher than a predetermined position being protruded in the left direction or the right direction. The predetermined position is a position where an inner surface of the inside wall 40A at a lower surface side of the protruding section 41 is away by a distance T from a lower surface of the scanner base 27 that forms a lower portion of the scanning unit 25 (see FIG. 7).

The distance T is a distance adapted to, even though one or more operators lift the MFP 1 using the protruding sections 41 and the first finger-holding portions 51, prevent the inner surface of the inside wall 40A at the lower surface side of each protruding section 41 from contacting the lower surface of the scanner base 27. Specifically, the distance T is set appropriately as needed by calculating a bending amount of the lower surface of each protruding section 41 at the time when the MFP 1 is lifted based on factors such as constituent material of the first cover member 40 and the weight of the MFP 1.

The second finger-holding portions 42 are formed at respective lower sides of the left side face and the right side face of the main body housing 10. The second finger-holding portions 42 are configured to be held by one or more operators at the time of transportation of the MFP 1. Specifically, each second finger-holding portion 42 is formed with a central portion of the first cover member 40 in a width direction (i.e., the front-to-rear direction of the MFP 1) being recessed upward in a box shape with predetermined dimensions at a lower end of the first cover member 40 forming the side cover 30. Thus, according to the MFP 1 of the embodiment, it is possible for one or more operators to transport the MFP 1 using the second finger-holding portions 42.

As shown in FIG. 8, the frame supporting portions 43 are formed at a plurality of end portions of each first cover member 40. The frame supporting portions 43 are used when the first cover members 40 are firmly attached to the main body frame 15 with screws. Namely, each first cover member 40 is fixed to the main body frame 15 in a plurality of positions where the frame supporting portions 43 are formed.

Each second cover member 50 is formed to cover the outer surface of the inside wall 40A of the first cover member 40, and provided with the first finger-holding portion 51. Specifically, each second cover member 50 is attached to the corresponding first cover member 40 so as to cover the lower surface and a portion higher than the lower surface of the inside wall 40A of the first cover member 40 (see FIG. 7). Each second cover member 50 and the corresponding first cover member 40 are firmly fixed to each other with engagement claws and screws (not shown). An upper end of each second cover member 50 contacts a lower end of the upper cover 20 such that an outer surface of the second cover member 50 and an outer surface of the upper cover 20 substantially form a single plane.

Each first finger-holding portion 51 is formed in a position of the second cover member 50 that corresponds to the lower surface of the inside wall 40A of the first cover member 40 and configured such that one or more operators put their fingers thereon. Specifically, each first finger-holding portion 51 is formed with a portion of the second cover member 50 that corresponds to the main scanning range Rm of the readable area R for the scanning unit 25 being recessed upward substantially in a box shape at the lower surface side of the protruding section 41 of the second cover member 50 (see FIG. 6). Namely, each first finger-holding portion 51 is formed in a box shape with a length in a longitudinal direction thereof (hereinafter referred to as a longitudinal-direction length) as long as the main scanning range Rm. As described above, the main scanning range Rm is as long as the short side of a legal-size document sheet. Therefore, each first finger-holding portion 51 is formed with such a size as to be held by at least two hands.

Each first finger-holding portion 51 is formed with a predetermined area of the lower surface of the protruding section 41 being recessed upward in a box shape. Therefore, each first finger-holding portion 51 includes side walls 51C extending in the vertical direction, which side walls are disposed at both ends of the box-shaped first finger-holding portion 51 in the front-to-rear direction and an outside end of the box-shaped first finger-holding portion 51 in the left-to-right direction (see FIG. 7). The side walls 51C are configured to bear a load applied when one or more operators move the MFP 1 using the first finger-holding portions 51. Thus, it is possible to attain an adequately enhanced stiffness of each first finger-holding portion 51.

Each first finger-holding portion 51 includes a plurality of first ribs 51A and a second rib 51B inside (see FIG. 7). The first ribs 51A extend in the longitudinal direction of the first finger-holding portion 51 (i.e., the front-to-rear direction of the MFP 1). Further, each first rib 51A has a predetermined length (height) in the vertical direction. In the embodiment, there are five first ribs 51A provided in each first finger-holding portion 51. Hence, when an operator puts his (her) fingers on the first finger-holding portion 51 to move the MFP 1, the fingers of the operator touch the plurality of first ribs 51A each of which extends in the longitudinal direction of the first finger-holding portion 51 (i.e., in the front-to-rear direction of the MFP 1). Thus, since the extending direction of the first ribs 51A is perpendicular to the direction in which the fingers holding the first finger-holding portion 51 are likely to slip, the first ribs 51A serve as slip stoppers.

In addition, the second rib 51B is provided at an outer side relative to the five first ribs in the left-to-right direction of the MFP 1. The second rib 51B extends in the longitudinal direction of the first finger-holding portion 51 (i.e., the front-to-rear direction of the MFP 1). Further, the second rib 51B is longer (higher) than the first ribs in the vertical direction (see FIG. 7). Accordingly, when the fingers of the operator that hold the first finger-holding portion 51 to move the MFP 1 slip, the fingers finally touch the second rib 51B. Namely, the second rib 51B, which extends in the longitudinal direction of the first finger-holding portion 51 and has a height higher than the first ribs 51A, serves as the last slip stopper.

Further, as illustrated in FIG. 9, according to the embodiment, the center of gravity G of the MFP 1 is located within a predetermined region, which is defined by connecting first formation regions La in which the first finger-holding portions 51 are respectively formed on the lower surfaces of the protruding sections 41 and second formation regions Lb in which the second finger-holding portions 42 are respectively formed at the lower ends of the side covers 30. Therefore, while one or more operators are moving the MFP 1 using the first finger-holding portions 51 and the second finger-holding portions 42, the MFP 1 can easily keep balance. As a result, the MFP 1 makes it possible to lighten burdens placed on the operators who move the MFP 1 using the first finger-holding portions 51 and the second finger-holding portions 42.

As described above, the MFP 1 of the embodiment includes the main body housing 10, the scanning unit 25, and the side covers 30. The scanning unit 25 is disposed at the upper side of the main body housing 10 (see FIGS. 2, 5, and 7), and configured to read out an image of a document sheet placed on the contact glass 26 with the reading sensor 28. Each side cover 30 includes the protruding section 41 formed with the upper portion of the side cover 30 being protruded outward relative to the MFP 1 (in the left or right direction), which upper portion is higher than the predetermined position below the scanning unit 25 disposed at the upper side of the MFP 1 (see FIG. 1). Each protruding section 41 is formed with the first finger-holding portion 51 (see FIGS. 6 and 7). Thus, according to the MFP 1, one or more operators can put their fingers on the first finger-holding portion 51 from below to move the MFP 1 using the first finger-holding portion 51. Further, since the first finger-holding portions 51 are disposed at the upper side of the MFP 1, even though the MFP 1 is a large-sized heavy apparatus, the operators do not have to take improper postures to move the MFP 1. Thereby, the MFP 1 can make it possible to lighten burdens placed on the operators at the time of transportation thereof.

Further, each first finger-holding portion 51 is formed with a longitudinal-direction length as long as the main scanning range Rm of the readable area R for the scanning unit 25 (see FIG. 7). The main scanning range Rm is as long as the length of the short side of the legal size. Therefore, each first finger-holding portion 51 is configured such that at least two hands can be put thereon. Thus, according to the MFP 1, since two or more operators can move the MFP 1 together using the first finger-holding portions 51, it is possible to lighten burdens placed on each operator at the time of transportation of the MFP 1 even though the MFP 1 is a large-sized heavy apparatus.

Figure 6:
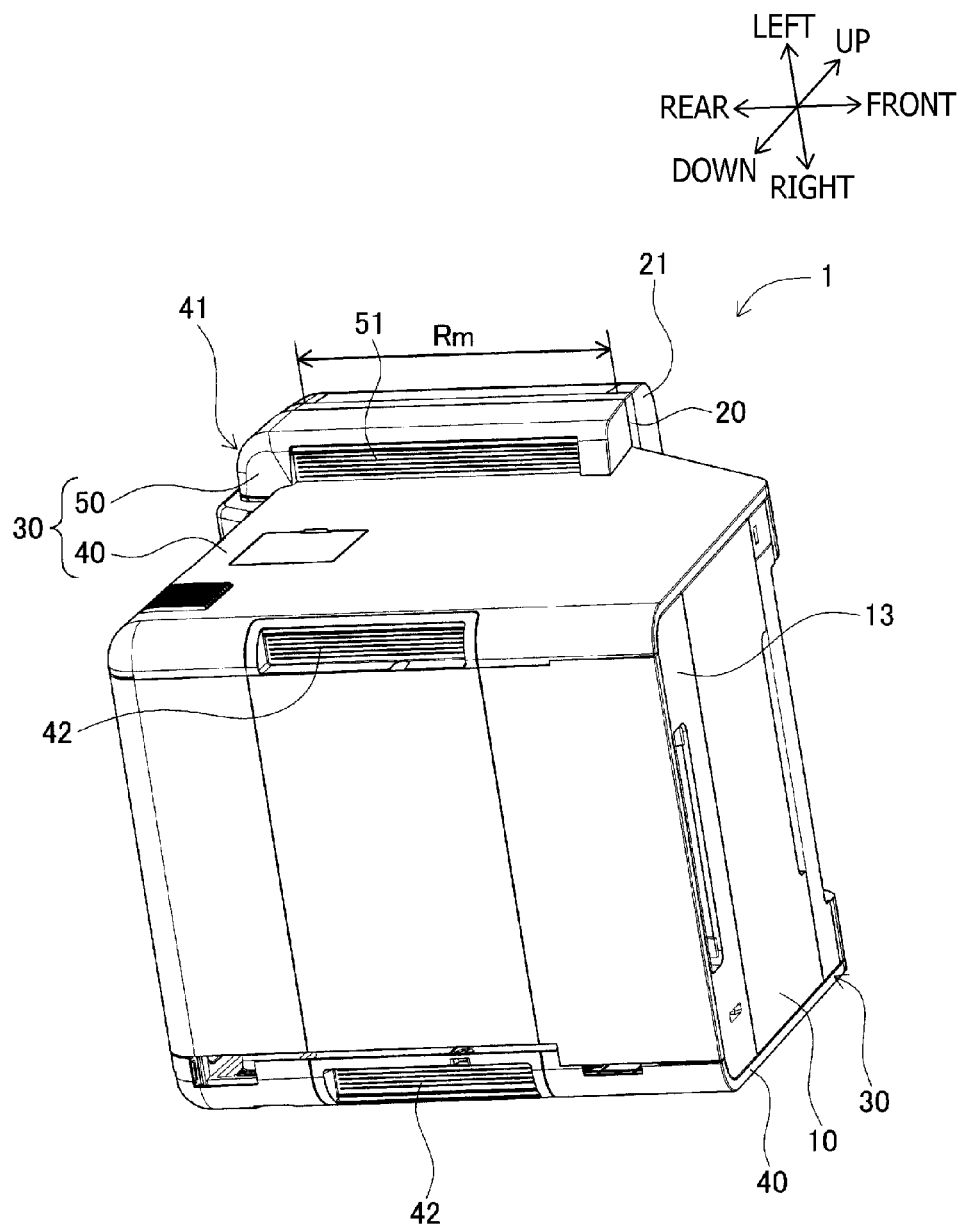
FIG. 6 is an external perspective view of the MFP viewed from below, showing a first finger-holding portion and second finger-holding portions in the embodiment according to one or more aspects of the present invention.

Further, each first finger-holding portion 51 includes the ribs (the first ribs 51A and the second rib 51B) formed continuously along the longitudinal direction of the first finger-holding portion 51 (see FIGS. 6 and 7). Accordingly, when an operator puts his (her) fingers on the first finger-holding portion 51, the operator's fingers touch the first ribs 51A or the second rib 51B everywhere on the first finger-holding portion 51. Since each of the ribs (the first ribs 51A and the second rib 51B) extends in the longitudinal direction of the first finger-holding portion 51, which direction is perpendicular to the direction in which the fingers holding the first finger-holding portion 51 are likely to slip, the first ribs 51A serve as slip stoppers. Thus, according to the MFP 1, it is possible to prevent dropping of the MFP 1 owing to finger slipping.

Further, since the operators can firmly hold the MFP 1, it is possible to lighten burdens placed on the operators at the time of transportation of the MFP 1.

Further, in the MFP 1, the inner surface of the inside wall 40A at the lower surface side of each protruding section 41 is away by the distance T from the lower surface of the scanner base 27 that forms the lower portion of the scanning unit 25 (see FIG. 7). Accordingly, when the MFP 1 is transported using the first finger-holding portions 51, the inner surface of the inside wall 40A at the lower surface side of each protruding section 41 does not come into contact with the lower surface of the scanning unit 25. Thus, it is possible to prevent the scanning unit 25 from being damaged owing to contact with the inner surfaces of the inside walls 40A at the lower surface side of the protruding sections 41 when the MFP 1 is transported using the first finger-holding portions 51.

Further, in the MFP 1, each side cover 30 includes the first cover member 40 and the second cover member 50. The first cover members 40 form the left and right faces of the main body housing 10. The upper portion of each first cover member 40 higher than the predetermined position below the scanning unit 25 protrudes outward relative to the main body housing 10, and forms the inside wall 40A of the protruding section 41. Each second cover member 50 is attached to the corresponding first cover member 40 to cover the outer surface of the inside wall 40A at a portion higher than the lower surface of the protruding section 41, so as to form an outer wall of the protruding section 41 (see FIG. 7). Thus, according to the MFP 1, it is possible to attain adequately enhanced stiffness of the protruding sections 41 and the first finger-holding portions 51, and to prevent the inside walls 40A from being deformed toward the lower surface of the scanning unit 25.

Further, each first cover member 40 is fixed to the main body frame 15, which supports various elements inside the main body housing 10, in a plurality of positions of the first cover member 40. Thus, according to the MFP 1, when the MFP 1 is moved using the first finger-holding portions 51, the load based on the weight of the MFP 1 is distributed on fixed portions around the frame supporting portions 43 without being focused on regions around the first finger-holding portions 51. Namely, according to the MFP 1, it is possible to prevent the inside walls 40A of the protruding sections 41 from being deformed when the MFP 1 is moved using the first finger-holding portions 51. Thereby, according to the MFP 1, it is possible to certainly prevent the scanning unit 25 from being damaged owing to contact with the inside walls 40A of the protruding sections 41.

Further, each first finger-holding portion 51 is formed in a box shape with a longitudinal-direction length as long as the main scanning range Rm. Accordingly, each first finger-holding portion 51 includes side walls 51C extending in the vertical direction, which side walls are disposed at the both ends of the box-shaped first finger-holding portion 51 in the front-to-rear direction and the outside end of the box-shaped first finger-holding portion 51 in the left-to-right direction (see FIG. 7). The side walls 51C are configured with such the adequate stiffness enough to bear the load applied when one or more operators move the MFP 1 using the first finger-holding portions 51. Thus, it is possible to attain an adequately enhanced stiffness of each first finger-holding portion 51. Consequently, it is possible to prevent the inside walls 40A of the protruding sections 41 from being deformed when the MFP 1 is moved using the first finger-holding portions 51. Thereby, it is possible to more certainly prevent the scanning unit 25 from being damaged owing to contact with the inside walls 40A of the protruding sections 41.

Further, outside the both ends of each first finger-holding portion 51 in the longitudinal direction thereof, the second cover member 50 forms the lower surface of the protruding section 41. In other words, each first finger-holding portion 51 is formed within a predetermined range at the center of the protruding section 41. Thus, according to the embodiment, it is possible to move the MFP 1 while maintaining a stable posture of the MFP 1.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications may be practicable.

MODIFICATIONS

Aspects of the present invention may be applied to an image scanner that has a document reading function.

In the aforementioned embodiment, the protruding sections 41 are formed at the both ends of the main body housing 10 of the MFP 1 in the left-to-right direction, respectively. However, the protruding sections 41 may be formed on the front face and the rear face of the main body housing 10 of the MFP 1, respectively.

In the aforementioned embodiment, each protruding section 41 is configured with the inside wall 40A of the first cover member 40 being covered with the second cover member 50. However, each protruding section 41 may be configured only with the first cover member 40 as far as the protruding section 41 can maintain an adequate stiffness thereof. In this case, each first finger-holding portion 51 may be formed directly on a lower surface of a protruding section which is formed with the first cover member 40.

In the aforementioned embodiment, each first finger-holding portion 51 includes the five first ribs 51A and the one second rib 51B. However, the numbers of the first ribs 51A and the second rib 51B may be changed as needed, as far as the relative positional relationship between the first ribs 51A and the second rib 51B can be maintained.

What is claimed is:
1. A document reader comprising:
    a main body housing configured to accommodate various components of the document reader;
    a reading unit disposed at an upper side of the main body housing, the reading unit being configured to read an image of a document sheet; and
    side covers disposed to face each other to form side faces of the main body housing, each of the side covers comprising:

a lower holding portion formed in a predetermined position on a lower end portion of each side cover; and a protruding section formed with an upper portion of the side cover protruding outward relative to the main body housing, the upper portion being higher than a predetermined position below the reading unit, the protruding section comprising:

an upper holding portion formed to extend in a longitudinal direction parallel to a main scanning direction of the reading unit, on a lower surface of the protruding section, and having a length in the longitudinal direction that is longer than a length of the lower holding portion in the longitudinal direction and as long as a length of a readable range for the reading unit in the main scanning direction, the upper holding portion comprising one or more ribs formed along the longitudinal direction of the upper holding portion, wherein the lower holding portion of one side cover is positioned at a same vertical height as the lower holding portion of the opposite side cover, and wherein the upper holding portion of the one side cover is positioned at a same vertical height as the upper holding portion of the opposite side cover, and wherein the protruding section of each side cover includes a cover member that includes: (a) a first upward wall located outside and along a side of the reading unit and (b) an inward protruding wall extending from the first upward wall and located outside and proximate to but not in contact with a bottom surface of the reading unit, wherein the inward protruding wall includes the upper holding portion.

2. The document reader according to claim 1, further comprising a frame configured to support the various components of the document reader inside the main body housing,
wherein each side cover further comprises:
a first member configured to form one of the side faces of the main body housing that face each other, the first member having a protruding portion that protrudes outward relative to the main body housing to form an inside wall of the protruding section, the protruding portion being higher than the predetermined position below the reading unit, the first member being fixed to the frame in a plurality of positions; and
wherein the cover member of each side cover is disposed to cover an outer surface of the inside wall of the protruding section formed by the first member.

3. The document reader according to claim 1, wherein the upper holding portion is formed in a box shape recessed upward relative to a lower surface of the protruding section, the lower surface being located outside both ends of the upper holding portion in the longitudinal direction of the upper holding portion.

4. The document reader according to claim 1,
wherein the document reader has a center of gravity located within a predetermined region that is defined by connecting first formation regions in which the upper holding portions are respectively formed on the lower surfaces of the protruding sections and second formation regions in which the lower holding portions are respectively formed on the lower ends of the side covers.

5. The document reader according to claim 1,
wherein each upper holding portion comprises:
a plurality of first ribs each of which is formed with a first height along the longitudinal direction of the upper holding portion; and
a second rib disposed at an outer side of the main body housing relative to the plurality of first ribs, the second rib being formed with a second height higher than the first height, along the longitudinal direction of the upper holding portion.

6. The document reader according to claim 1, wherein an outer wall of the protruding section of each side cover extends vertically to a height of a contact glass of the reading unit.

7. The document reader according to claim 1, wherein the first upward wall of the cover member extends vertically to a height of a contact glass of the reading unit.

8. The document reader according to claim 1, wherein the first upward wall, the outward protruding wall, and the second upward wall of the protruding section of each side cover are formed as part of a first cover member.

9. The document reader according to claim 8, wherein the protruding section of each side cover further includes a second cover member that includes: (a) a third upward wall located outside and engaging the second upward wall of the first cover member and (b) an inward protruding wall extending from the third upward wall and located outside and adjacent the outward protruding wall of the first cover member, wherein the inward protruding wall includes the upper holding portion.

10. The document reader according to claim 9, wherein the third upward wall of the second cover member extends vertically to a height of a contact glass of the reading unit.

11. A document reader comprising:
a main body housing configured to accommodate various components of the document reader;
a reading unit disposed at an upper side of the main body housing so as to protrude outward from mutually-facing side faces of the main body housing, the reading unit configured to read an image of a document sheet; and
side covers configured to form the mutually-facing side faces of the main body housing, each of the side covers comprising:
a protruding section disposed a predetermined distance away from a lower surface of the reading unit that protrudes outward from a corresponding one of the mutually-facing side faces of the main body housing, so as to cover the lower surface and a side surface of the reading unit from outside, the protruding section formed to protrude outward from the corresponding one of the mutually-facing side faces of the main body housing;
a first member configured to form the corresponding one of the mutually-facing side faces of the main body housing, and form an inside wall of the protruding section that covers the lower surface and the side surface of the reading unit from outside, the first member fixed, in a plurality of positions thereof, to a frame configured to support the various components of the document reader inside the main body housing;
a second member disposed to cover an outer surface of the first member as the inside wall of the protruding section, the second member configured to form an outside wall of the protruding section, the second member comprising:
a first holding portion disposed on a lower surface of the protruding section, the first holding portion formed with a length in a longitudinal direction thereof corresponding to a length of the reading unit in a main scanning direction, the first holding portion comprising one or more ribs formed along the longitudinal direction of the first holding portion; and
a second holding portion formed on a lower end portion of each side cover, the second holding portion having a length in the longitudinal direction that is shorter than a length of the first holding portion, wherein the first holding portion of one side cover is positioned at a same vertical height as the first holding portion of the opposite side cover, and wherein the second holding portion of the one side cover is positioned at a same vertical height as the second holding portion of the opposite side cover, wherein the first member of each side cover is defined in part by: (a) a first upward wall that extends proximate to but not in contact with the lower surface of the reading unit, wherein the inside wall of the first member extends from the first upward wall and in a direction along and adjacent but not in contact with the lower surface of the reading unit, and (b) a second upward wall that extends from the inside wall, along the side surface of the reading unit, and inside the second member.

12. The document reader according to claim 11, wherein the second member of each side cover extends vertically to a height of a contact glass of the reading unit.

13. A The document reader comprising:
- a main body housing configured to accommodate various components of the document reader;
- a reading unit disposed at an upper side of the main body housing, the reading unit being configured to read an image of a document sheet; and
- side covers configured to face each other to form side faces of the main body housing, each of the side covers comprising:
- a lower holding portion formed in a predetermined position on a lower end portion of each side cover; and
- a protruding section formed with an upper portion of the side cover protruding outward relative to the main body housing, the upper portion being higher than a predetermined position below the reading unit, the protruding section comprising:
- an upper holding portion formed to extend in a longitudinal direction parallel to a main scanning direction of the reading unit, on a lower surface of the protruding section, and having a length in the longitudinal direction that is longer than a length of the lower holding portion in the longitudinal direction and as long as a length of a readable range for the reading unit in the main scanning direction, the upper holding portion comprising one or more ribs formed along the longitudinal direction of the upper holding portion, wherein the lower holding portion of one side cover is positioned at a same vertical height as the lower holding portion of the opposite side cover, and wherein the upper holding portion of the one side cover is positioned at a same vertical height as the upper holding portion of the opposite side cover, wherein the protruding section of each side cover is defined in part by: (a) a first upward wall that extends proximate to but not in contact with the lower surface of the reading unit, (b) an outward protruding wall that extends from the first upward wall and in a direction along and adjacent but not in contact with the lower surface of the reading unit, wherein the outward protruding wall forms a part of the protruding section that protrudes outward relative to the main body housing, and (c) a second upward wall that extends from the outward protruding wall and along a side of the reading unit.

* * * * *